(12) United States Patent
Nettis et al.

(10) Patent No.: US 6,602,033 B2
(45) Date of Patent: Aug. 5, 2003

(54) REVERSIBLE FASTENING DEVICE

(75) Inventors: Francesco Nettis, Via Bitritto, 131, 70124 Bari (IT); Francesco Filippi, Lugo (IT); Carmine Santarpia, Bitonto (IT)

(73) Assignee: Francesco Nettis, Bari (IT)

( * ) Notice: Subject to any disclaimer, the term of this patent is extended or adjusted under 35 U.S.C. 154(b) by 0 days.

(21) Appl. No.: 09/780,938

(22) Filed: Feb. 9, 2001

(65) Prior Publication Data

US 2001/0026744 A1 Oct. 4, 2001

Related U.S. Application Data

(63) Continuation of application No. PCT/IT99/00264, filed on Aug. 12, 1999.

(30) Foreign Application Priority Data

Aug. 12, 1998 (IT) .......................................... BO98A0496

(51) Int. Cl.⁷ ................................................. F16B 13/04
(52) U.S. Cl. ..................... 411/21; 411/57.1; 411/60.1
(58) Field of Search ...................... 411/21, 57.1, 60.1, 411/72, 77, 354

(56) References Cited

U.S. PATENT DOCUMENTS

| | | | | |
|---|---|---|---|---|
| 2,782,672 A | * | 2/1957 | Davis | 411/354 |
| 3,434,748 A | | 3/1969 | Leurent | |
| 4,671,718 A | * | 6/1987 | Eakin | 411/21 X |
| 5,927,919 A | * | 7/1999 | Blankenship et al. | 411/60.1 |
| 6,196,779 B1 | * | 3/2001 | Falk | 411/57.1 |
| 6,299,397 B1 | * | 10/2001 | Mengel | 411/60.1 X |

FOREIGN PATENT DOCUMENTS

DE            3812179           10/1989

* cited by examiner

Primary Examiner—Neill Wilson
(74) Attorney, Agent, or Firm—Ladas & Parry (57) ABSTRACT

A reversible fastening device (50) for reversibly fastening connecting means (51) connecting a first (52) and a second member (53); the connecting means (51) being housed entirely inside the first member (52); and the device (50) being characterized in that, at a first reversible stage, the connecting means (51) are moved from a withdrawn position to an extracted position projecting with respect to the first member (52); and in that the desired reversible fastening of the connecting means (51) connecting the first (52) and the second (53) member is achieved in the extracted position.

19 Claims, 8 Drawing Sheets

REVERSIBLE FASTENING DEVICE

This is a continuation of PCT/IT99/00264, filed Aug. 12, 1999.

TECHNICAL FIELD

The present invention relates to a reversible fastening device for connecting means connecting a first and a second member; which members may form part of a lath structure, in particular a modular structure from which to also manufacture furniture.

BACKGROUND ART

British Patent Application GB A-2 119 054 (Exibelco) describes a reversible fastening device for fastening a cross member to an upright, both forming part of a modular structure. The device substantially comprises a gripper-type member projecting with respect to the cross member; and a cam mechanism which is housed inside the cross member, is operated externally using an Allen wrench, and withdraws the gripper to part the two gripper arms and reversibly fasten the gripper inside a cavity in the upright in which the gripper is inserted.

A major drawback of the above device lies in the gripper projecting from the end of the cross member even in the rest position, i.e. prior to assembly, whereas, for certain assembly jobs—e.g. when adding a new portion of a modular structure onto an already-assembled, functional portion (e.g. loaded with books)—it is essential that the connecting means, such as the above grippers, be withdrawn and so prevented from interfering with fitment of the cross member to the upright. The same problem is also encountered, for example, when inserting a cross member between two fixed uprights separated by a distance exactly equal to the length of the cross member.

For the reversible fastening device to function properly, therefore, it is essential that the device be housed entirely inside the cross member when fitting the end of the cross member to the lateral surface of the upright, and that the device only projects from the end of the cross member to actually fasten the connecting means reversibly inside the cavity formed for the purpose inside the upright.

SUMMARY OF INVENTION

It is an object of the present invention to provide a straightforward, reliable solution to the above problem.

According to the present invention, there is provided a reversible fastening device as claimed in Claim 1.

The reversible fastening device according to the present invention provides for highly reliable fitment of a first body to a second body; and employing a lever mechanism ensures excellent retention of the connecting means inside the respective seats.

The Fastening device according to the present invention advantageously comprises a piston and a draw rod connected to each other by elastic means enabling parting of the piston and the draw rod, so as to prevent excessive stress being applied by the user when inserting the device, and so as to enable the system to also withstand unexpected stress due, for example, to sharp changes in ambient temperature.

BRIEF DESCRIPTION OF THE DRAWINGS

A number of non-limiting embodiments of the present invention will be described by way of example with reference to the accompanying drawings, in which:

FIGS. 7–9 show a second embodiment of the device according to the present invention, in which the levers in the first embodiment are replaced by a cam assembly; in particular, FIGS. 7–9 show the second embodiment of the device at an initial first stage, an intermediate second stage and a final third stage respectively.

BEST MODE FOR CARRYING OUT THE INVENTION

Figure 1:
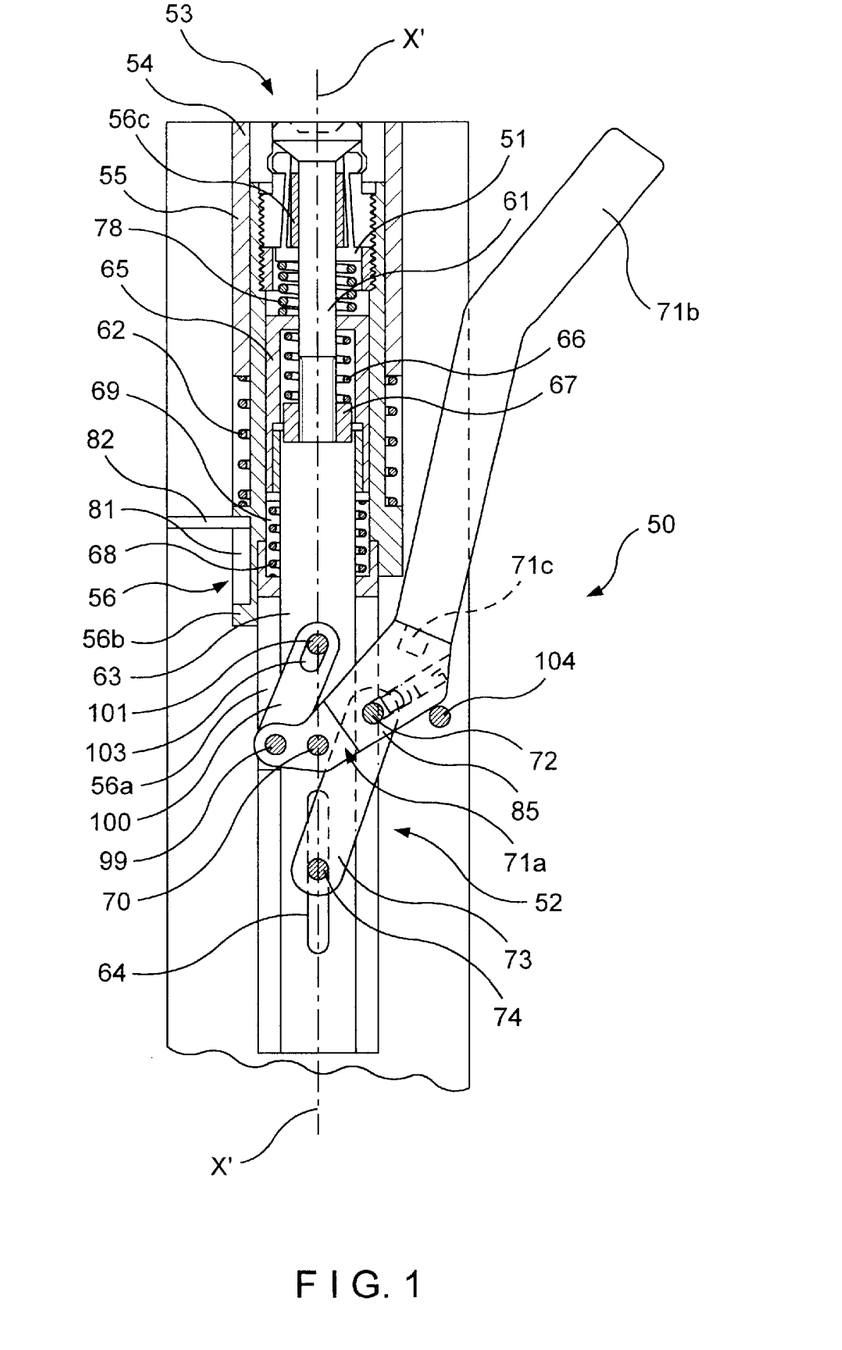
FIG. 1 shows, in a first (withdrawn) position, a first embodiment of the reversible fastening device according to the present invention.

The first embodiment in FIG. 1 shows a reversible fastening device 50 for fastening a connecting member 51 connecting a first member 52 and a second member 53. In the example shown, the first member 52 is a lath member, and the second member 53 is a cubic member used, together with first member 52, to form modular structures (not shown) in turn used, for example, for manufacturing furniture.

First member 52 houses a main member 54 made of metal and inserted inside a hole 55; and a movable assembly 56, forming part of reversible fastening device 50 in every respect, slides inside main member 54 and hole 55.

Movable assembly 56 comprises a series of components 56a, 56b, 56c connected to one another in conventional manner.

Figure 4A:
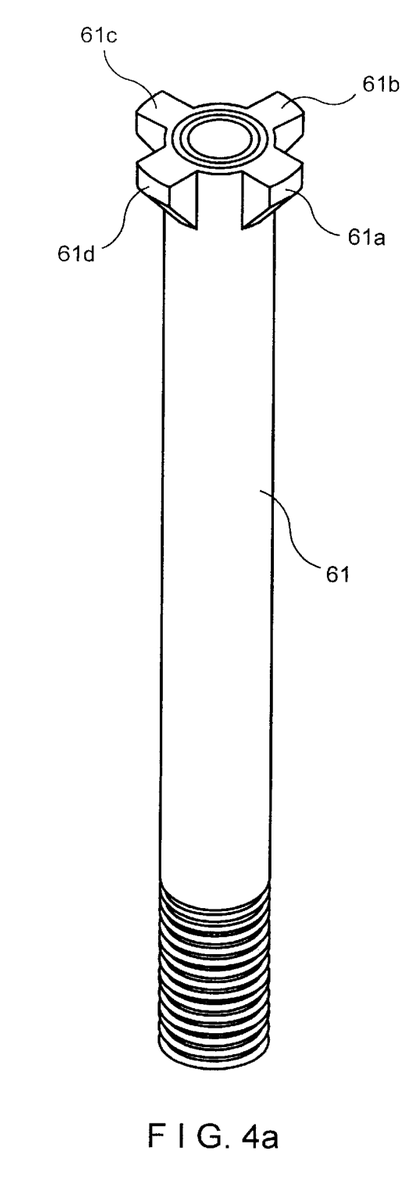
FIG. 4 shows enlarged details of the movable assembly and the connecting member.
Figure 4B:
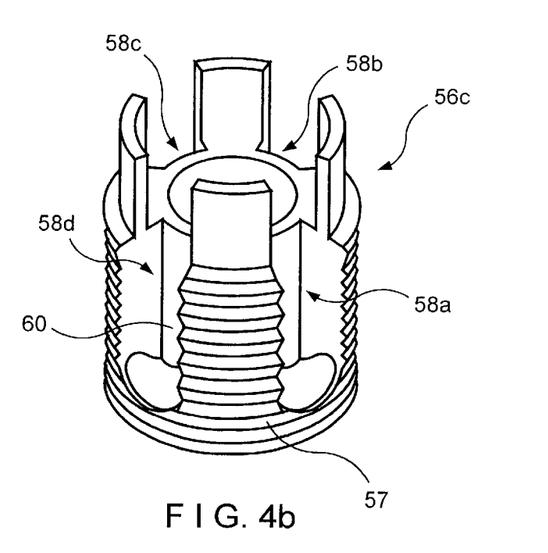
Figure 4C:
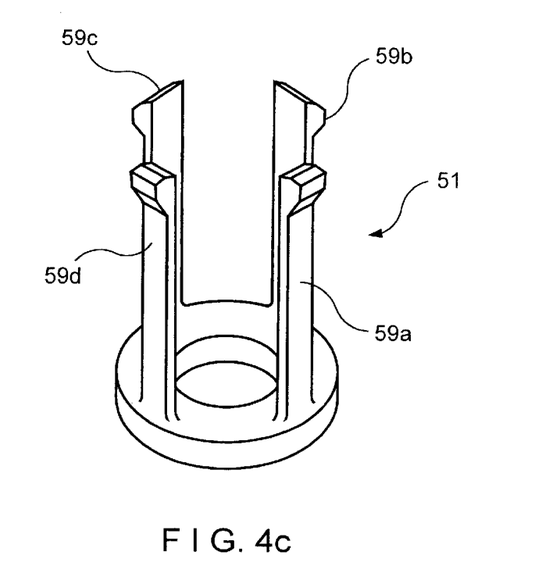
Figure 5:
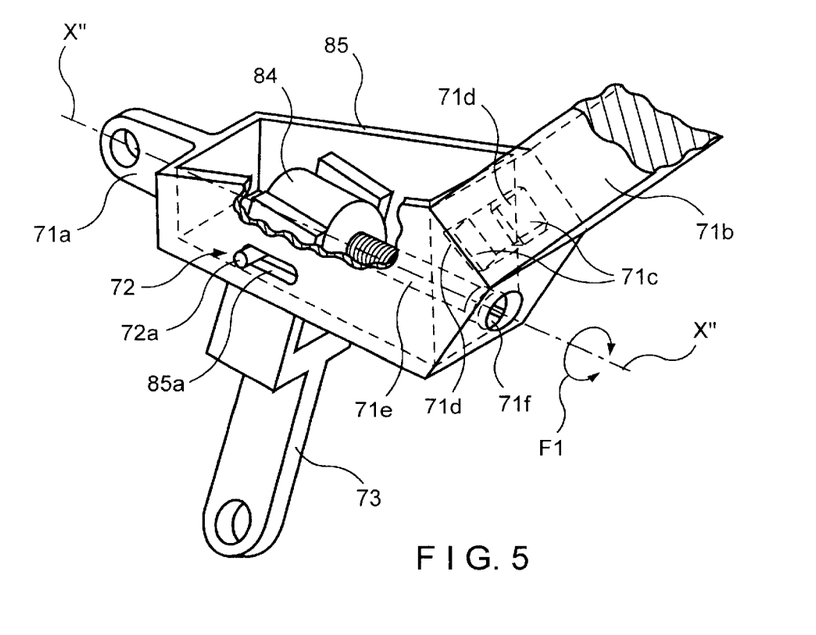
FIG. 5 shows the regulating system for adjusting the position of a pin connecting a connecting rod to a crank, both forming part of a movable assembly actuating mechanism.
Figure 6:
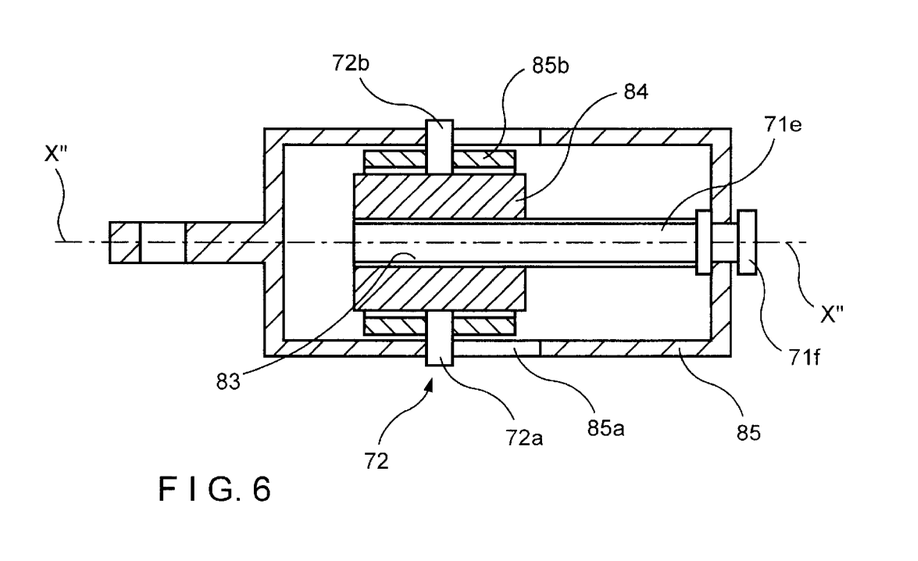
FIG. 6 shows a longitudinal section of the FIG. 5 regulating system.

As shown in FIG. 4b, component 56c is defined by an outer main body 57 having a series of slots 58a–58d from which project prongs 59a–59d of connecting member 51, which, in the example shown, is defined by an elastic gripper (FIG. 4c). Component 56c also comprises a bush 60 coaxial with outer main body 57 and inside which the rod of a piston 61 (FIG. 4a) slides freely both ways in a vertical direction coincident with the axis X'—X' of symmetry of device 50 as a whole. As explained in detail later on, piston 61 provides for deforming prongs 59a–59d of connecting member 51 (FIG. 4c) elastically outwards.

Figure 2:
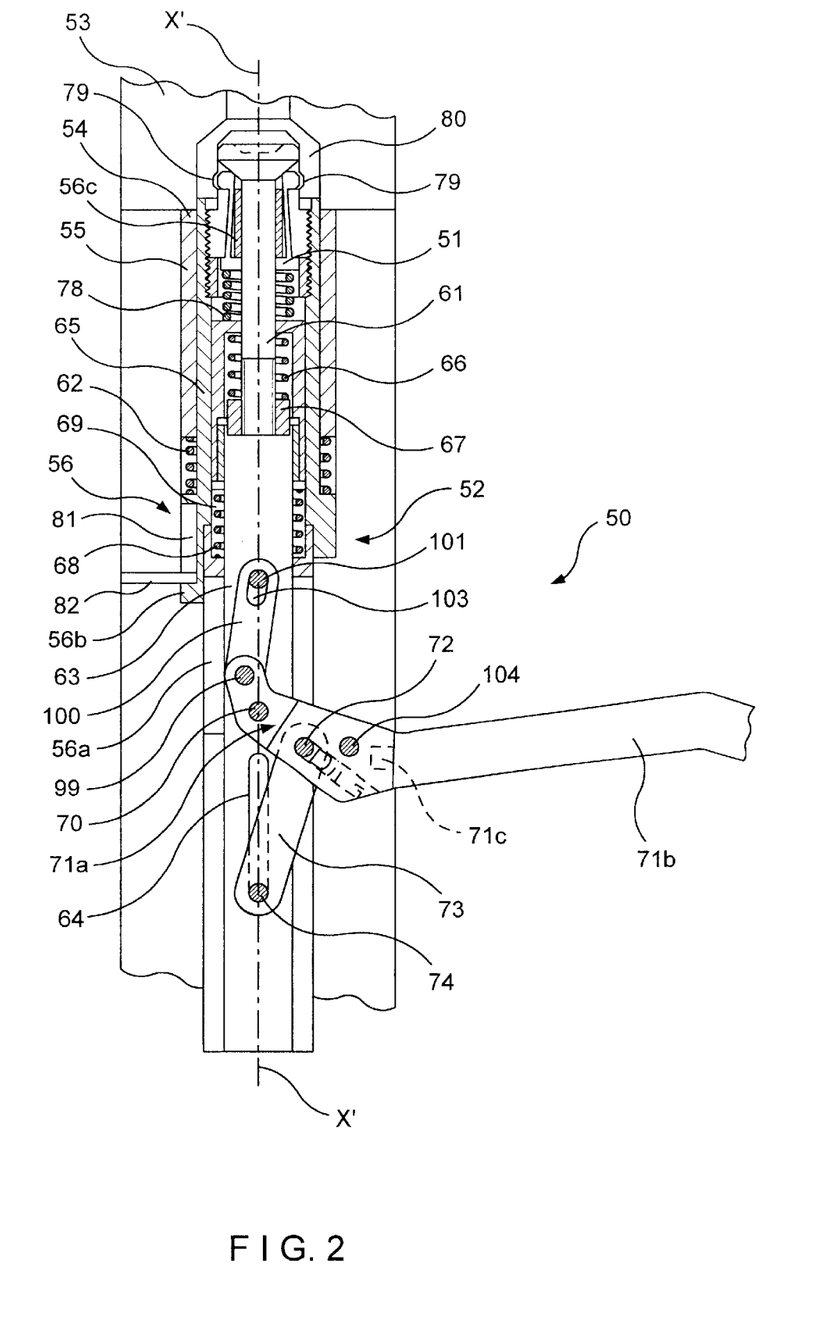
FIG. 2 shows the FIG. 1 device in a second (extracted) position in which the connecting member is extracted from the first member.
Figure 3:
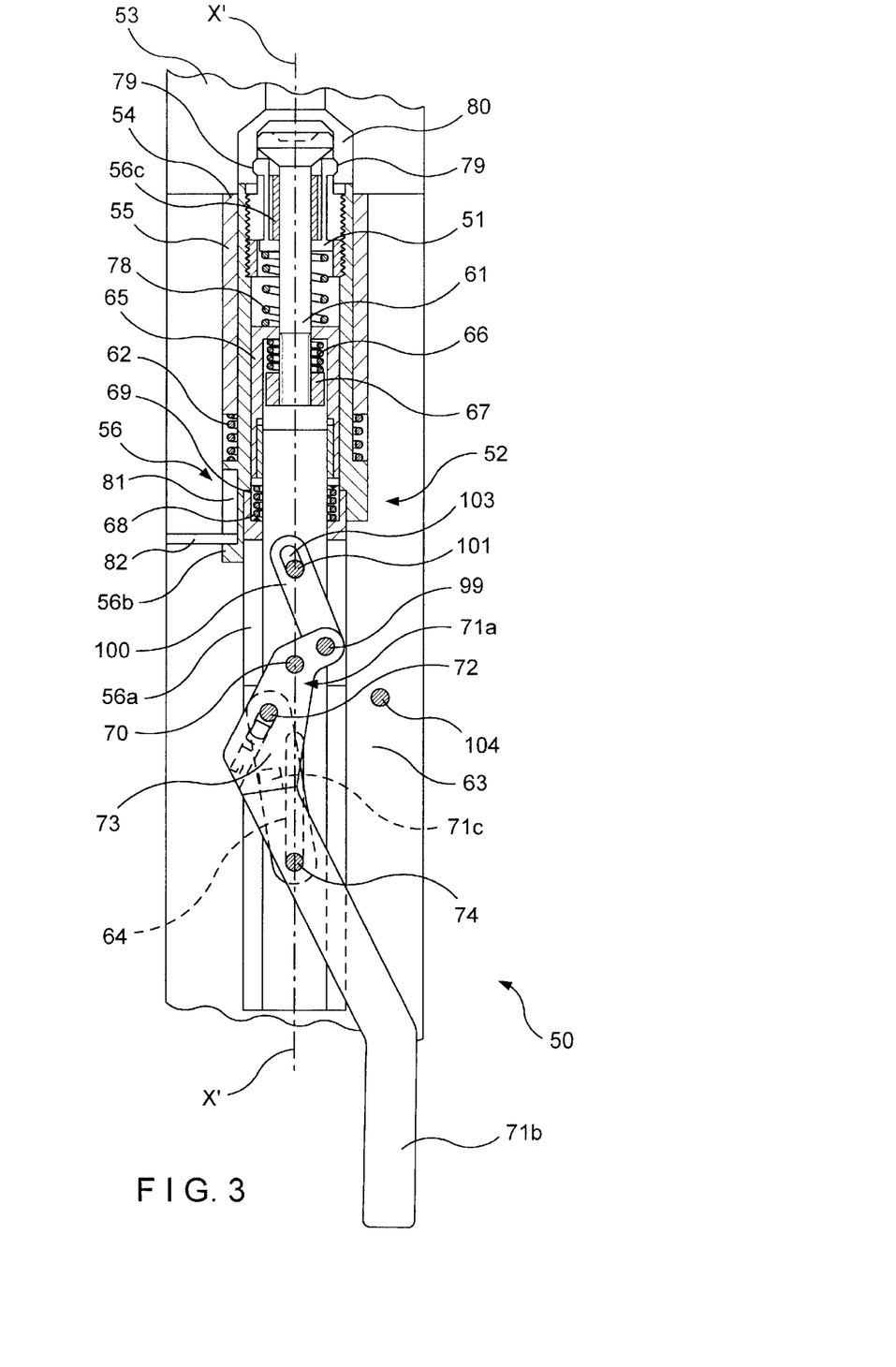
FIG. 3 shows the FIGS. 1–2 device in a third (intermediate) position in which the connecting member engages the seats formed in the second member.

Between movable assembly 56 as a whole and main member 54, provision may advantageously be made for a return spring 62, which is compressed by the upward movement of movable assembly 56, as shown in FIGS. 2, 3. The outer surface of component 56b has a groove 81, the length of which that can be travelled by a pin 82 integral with first member 52 equals the length by which movable assembly 56 projects when extracted (see below). That is, pin 82 acts as a limit stop for movable assembly 56 for the reason explained in more detail later on.

Movable assembly 56 houses a draw rod 63 having a slot 64 and a threaded top end for connection to a draw bush 65 housing a draw spring 66; one end of draw spring 66 rests on the bottom of draw bush 65, while the other end presses on a ring nut 67 screwed to a threaded end of the rod of piston 61, so that the top end of draw rod 63 and the bottom ends of piston 61 and ring nut 67 are freely partible when reversible fastening device 50 is in the work position shown in FIG. 3. This makes for a considerable improvement with respect to conventional devices, by the force fastening the two members 52, 53 being dissociated from the actual force applied, for example, by the user, thus preventing deformation of the seats 79 caused by the gripping means of connecting member 51 (FIGS. 2, 3).

In other words, draw spring 66, interposed as stated between piston 61 and draw rod 63, creates a sort of "elastic buffer" between the draw means operated directly by the user and piston 61, which acts on connecting member 51 to deform it elastically outwards. Once set to the work position, therefore, the system may safely withstand any axial variation in stress caused by swelling or shrinking of the two members 52, 53 as a result, for example, of a significant change in ambient temperature. This is a problem encountered frequently when first member 52 and/or second member 53 are made of wood; in which case, the size of members 52, 53 varies three-dimensionally with time. In particular, a reduction in humidity results in three-dimensional shrinkage, and an increase in humidity in three-dimensional swelling of members 52, 53.

A reloading spring 69 presses at a first end on an inner shoulder 68 of component 56a, rests at a second end on the bottom surface of draw bush 65, and provides for elastically connecting components 56a–56c to the rest of movable assembly 56, i.e. piston 61 as a whole, draw bush 65, spring 66, ring nut 67 and draw rod 63.

As shown in FIGS. 1–3, a connecting rod 100 has a first pin 101 which slides freely inside a slot 103 formed in component 56a of movable assembly 56 and in draw rod 63; and a second pin 99 about which connecting rod 100 and a connecting rod 71a pivot with respect to each other. Connecting rod 71a also has a third pin 72, about which rotates a crank 73, and also pivots about a fourth pin 70 fixed with respect to first member 52. At the opposite end to that hinged to pin 72, crank 73 comprises a fifth pin 74 which slides freely inside a slot 64 formed in draw rod 63.

As shown in FIGS. 1–3 and 5, connecting rod 71a is operated from the outside by means of a lever 71b which is connected to connecting rod 71a by means, for example, of a pair of plus 71c inserted inside a corresponding pair of seats 71d on connecting rod 71a. The importance of pins 71c will be explained in detail later on with reference to the assembly of device 50 as a whole.

A threaded shaft 71c screws inside a threaded hole 83 formed in a bush 84 housed inside a portion 85 of connecting rod 71a. Bush 84 carries, integrally with its outer surface, two pins 72a, 72b which together form pin 72 shown in FIGS. 1–3, and which slide inside respective slots 85a, 85b formed in portion 85 of connecting rod 71a. Consequently, when a screwdriver (not shown) inserted in head 71f of threaded 71e is turned in the direction of arrow $F_1$ about an axis X"—X", threaded shaft 71e is rotated and, engaging threaded hole 83, translates bush 84 along axis X"—X". Rotation of threaded shaft 71e in the direction of arrow $F_1$ is therefore converted into translation of bush 84, and hence of one end of crank 73, by virtue of pins 72a, 72b sliding inside respective slots 85a, 85b.

Any give in the elastic members of the system may be compensated by the user by adjusting the position of pin 72 to adjust the overall length of connecting rod 71a and crank 73.

As shown in FIGS. 1–3, the base of connecting member 51 is subjected to the action of a spring 78 which pushes the base against the cylindrical bush 60 (FIG. 4b) in which, as stated, the rod of piston 61 slides. The purpose of spring 78 is to keep connecting member 51 on a level with seats 79, formed in a socket 80 (FIGS. 2, 3) integral with second member 53, when piston 61 is lowered, thus preventing connecting member 51 from being drawn downwards, and so making connecting member 51 independent of piston 61 both during assembly and disassembly.

As shown in FIG. 4a, piston 61 comprises a number of teeth 61a–61d which, after assembly, correspond with prongs 59a–59d of connecting member 51 and with slots 58a–58d of component 56c, so that a downward movement of piston 61 produced by a downward movement of draw rod 63 causes teeth 61a–61d to rest against corresponding prongs 59a–59d of connecting member 51; and, continuing the downward movement along axis X'—X', prongs 59a–59d are deformed elastically outwards, so that the appropriately shaped heads of the prongs engage seats 79 (FIGS. 2, 3) formed on the inner walls of socket 80.

Obviously, if connecting member 51 is inserted inside any cavity in a second member 53, the elastic outward deformation of prongs 59a–59d of connecting member 51 provides for reversibly fastening first member 52 with respect to second member 53.

Releasable fastening device 50 is assembled inside first member 52 as follows:

(a) main member 54 and the other components of device 50, with the exception of lever 71b (FIG. 3), are inserted inside longitudinal hole 55 in first member 52 by means of a first machine (not shown);

(b) a second machine (not shown) raises and opens the lever mechanism defined by connecting rod 71a and crank 73 into the FIG. 2 configuration; lever 71b is then connected to connecting rod 71a by inserting the two pins 71c into respective seats 71d; and, at the same time, fixed pin 70 is inserted inside first member 52;

(c) rotation of lever 71b into the FIG. 3 position completes the assembly process, and device 50, combined with respective first member 52, is ready for sale.

Operation of the first embodiment of reversible fastening device 50 according to the present invention will be described with reference to FIGS. 1–3.

(A) As stated, FIG. 1 shows movable assembly 56 in the withdrawn position, i.e. housed entirely inside first member 52, so that the user first rotates lever 71b anticlockwise from the FIG. 3 to the FIG. 1 position.

(D) After placing the end—with no projecting parts—of first member 52 against second member 53, the user rotates lever 71b clockwise to raise pin 99 which, being integral with movable assembly 56 by means of connecting rod 100 and pin 101, also raises movable assembly 56.

(C) By means of reloading spring 69, the upward movement of components 56a–56c is also transmitted to draw bush 65 and therefore also to draw rod 63 screwed to draw bush 65.

(D) The upward movement of draw bush 65 produces an upward translation of spring 78 which, however, is not compressed on account of component 56c, integral with the other two components 56a, 56b, having already been raised.

(E) The system at this point is therefore in the extracted position shown in FIG. 2, in which some of the components, such as connecting member 51, components 56b, 56c and piston 61, project with respect to the end of first member 52. To lock lever 71b in the FIG. 2 position, member 52 may be provided with an integral device 104, which may advantageously be defined by a ball (not shown) stressed by elastic means (not shown) which push the ball inside a seat (not shown) formed in a lateral wall of lever 71b, so that, by switching the system from the FIG. 1 to the FIG. 2 configuration, the user locks lever 71b and the projecting components in the FIG. 2 configuration, and may, for example, let go of lever 71b temporarily to insert the projecting components more easily inside socket 80 using both hands.

(F) The projecting components, such as connecting member 51, components 56b, 56c and piston 61, may therefore be inserted inside a socket 80 integral with second member 53.

(G) In the course of all the above operations, the pin 74, about which crank 73 pivots, has moved slightly downwards (FIG. 2), thanks also to the resistance produced by limit-stop pin 82 on components 56b, 56a by means of groove 81.

(H) As connecting lever 71b is rotated further clockwise, pin 74, also integral with crank 73, begins pushing against the bottom wall of slot 64 in draw rod 63. It should be noted that, in the FIG. 3 system configuration, connecting rod 71a has assumed a "negative" inclination with respect to axis X'—X'.

(I) Draw rod 63 is therefore drawn downwards, thus drawing downwards draw bush 65 which compresses draw spring 66; ring nut 67 and, consequently, piston 61 are lowered via the interposition of draw spring 66; and the bottom surfaces of teeth 61a–61d press against corresponding prongs 59a–59d of connecting member 51 to deform the prongs elastically outwards and insert the heads of prongs 59a–59d inside the corresponding seats 79 on the inside of socket 80 integral with second member 53 and by which first member 52 is fastened to second member 53.

(L) It should be noted that, as shown in FIG. 3, when lowering draw rod 63, the bottom end of piston 61 and the bottom surface of ring nut 67 are detached from the top end of draw rod 63 so as to compress draw spring 66; and the mechanism is locked by connecting rod 71a forming a "negative" angle with the axis X'—X' of symmetry of the system.

(M) To restore the system to the FIG. 1 configuration to detach first member 52 from second member 53, lever 71b is simply turned in the opposite, i.e. anticlockwise, direction to restore the various components to their original positions by means of springs 62, 66, 69.

The above operations provide for a highly effective reversible fastening device 50 capable of exerting considerable fastening force between the two members 52, 53.

Figure 7A:
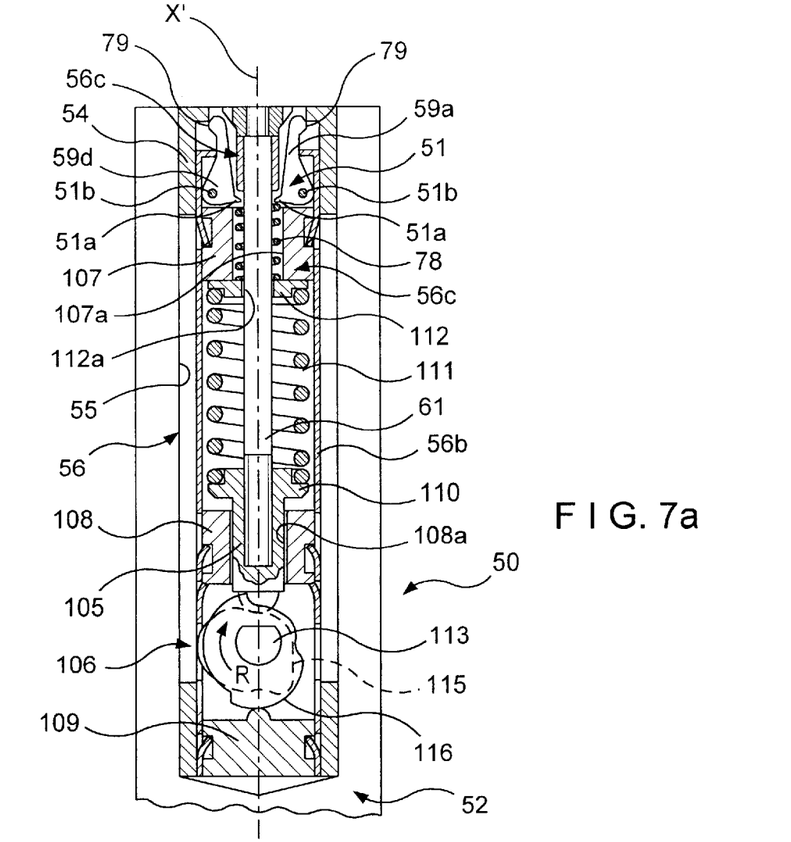
Figure 7B:
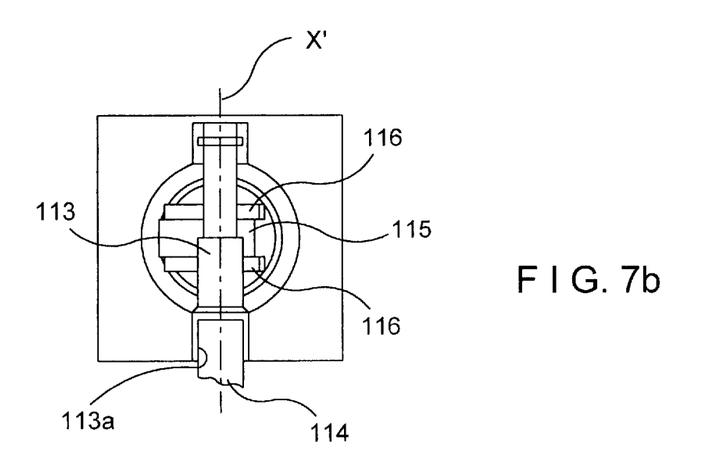
Figure 8A:
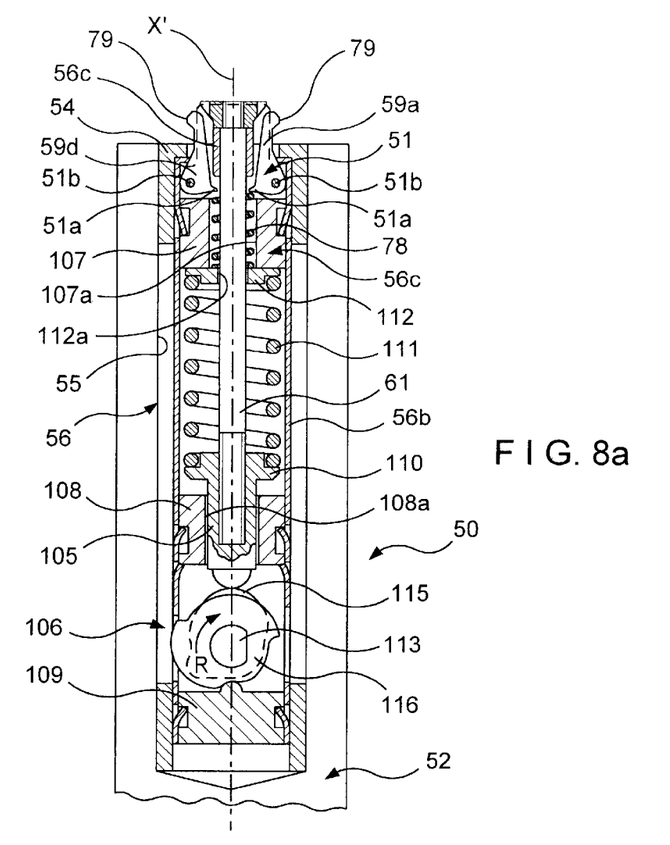
Figure 8B:
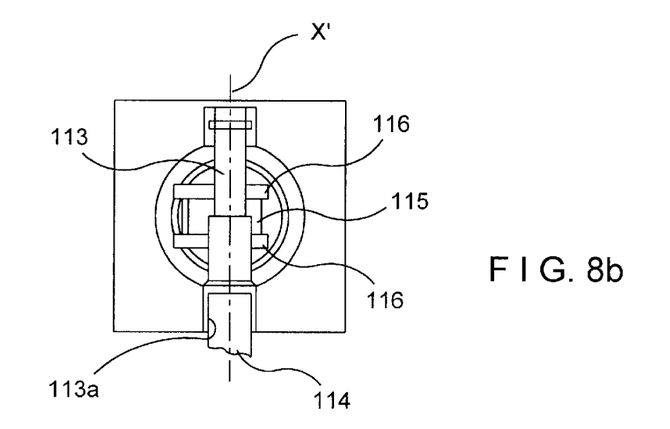
Figure 9A:
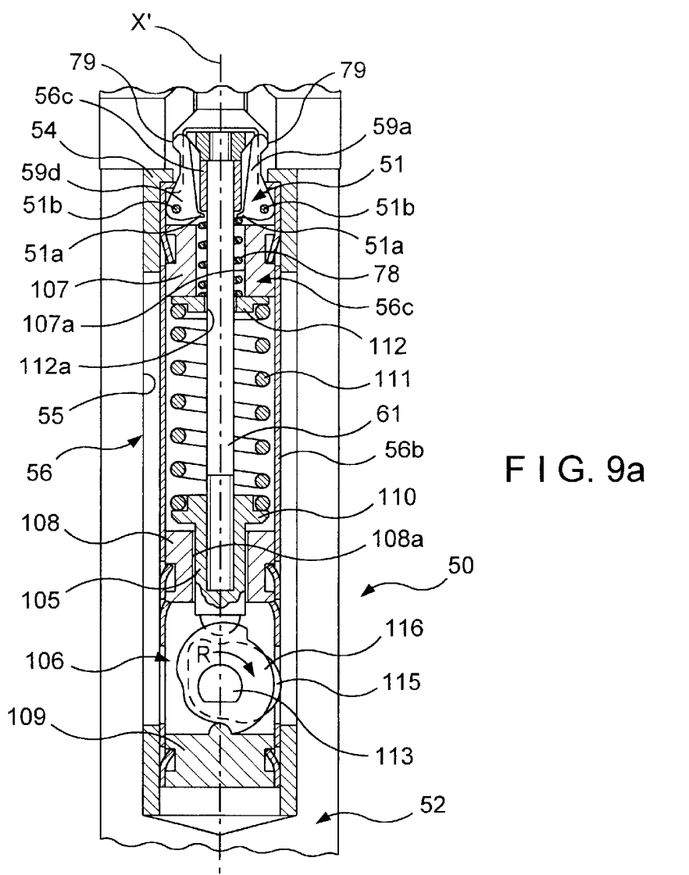
Figure 9B:
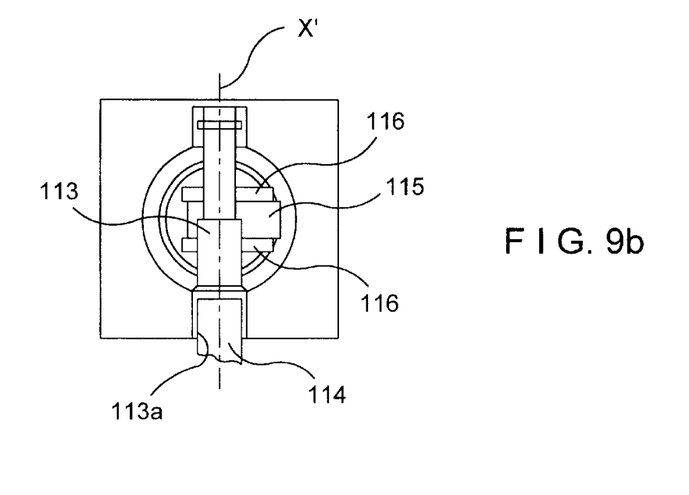

In the second embodiment shown in FIGS. 7–9, any similar or identical parts are indicated using the same reference numbers as for the first embodiment in FIGS. 1–6.

In the second embodiment, movable assembly 56 is again housed inside substantially cylindrical main member 54, in turn housed inside hole 55 formed in member 52.

In addition to connecting member 51, components 56b, 56c and piston 61, movable assembly 55 also comprises a stylus 105 screwed to piston 61; and component 56b in the second embodiment is in the form of a substantially tubular sleeve enclosing the other components of movable assembly 56.

As described in detail later on, stylus 105 may be activated by a cam assembly 106 also housed inside member 52.

Component 56b of movable assembly 56 comprises a top plug 107, an intermediate plug 108, and a bottom plug 109; stylus 105 comprises a bracket 110; the two ends of a helical load spring 111 rest on respective brackets 110, 112; top plug 107 has a through hole 107a in which the rod of piston 61 slides; intermediate plug 108 has a similar through hole 108a fitted through with stylus 105 which, as stated, is integral with piston 61; through hole 107a also houses a spring 78, the top end of which contacts appendixes 51a of prongs 59a–59d of connecting member 51, and the bottom end of which rests on bracket 112 which has a through hole 112a fitted through with the rod of piston 61; and prongs 59a–59d of connecting member 51 are hinged by pins 51b to component 56b, so that the action of spring 78 on prongs 59a–59d produces a slight outward movement of prongs 59a–59d to click the heads of prongs 59a–59d slightly inside seats 79 on the inside of socket 80 (see below).

Cam assembly 106 comprises a pin 113 having a seat 113a for receiving an Allen wrench 114. Pin 113 is fitted with a central cam 115 which, in contact with stylus 105, raises the whole of movable assembly 56 during the first 90° rotation of wrench 114 (FIG. 8) in the direction of arrow R, i.e. clockwise in the example shown. Pin 113 is also fitted with two cams 116 on either side of central cam 115, and which contact bottom plug 109 and provide for raising movable assembly 56 together with connecting member 51 with no variation in the length of load spring 111 (FIGS. 7, 8).

When wrench 114 is rotated a further 90° in the direction of arrow R (FIG. 9), once connecting member 51 is inserted inside socket 80 of second member 53, the reduction in the radius of central cam 115 clicks down piston 61 and stylus 105 connected integrally to the piston. The downward movement of piston 61 is achieved by virtue of the action of spring 111 on bracket 110—which, as stated, is integral with piston 61—and produces a further outward movement of prongs 59a–59d, the free ends of which are inserted inside respective seats 79 inside socket 80 in the same way as in the first embodiment in FIGS. 1–6.

In the FIG. 9 configuration, piston 61 is suspended from spring 111 with the maximum preload to which spring 111 is set at the assembly stage.

As shown in FIG. 9, the bottom end of stylus 105 is detached from and separated by a distance, for example, of 1.3 mm from the surface of cam 115.

Rotation in the opposite direction to arrow R, i.e. anticlockwise in the example shown, switches the system from the FIG. 9 to the FIG. 7 configuration to disconnect first member 52 from second member 53.

The main advantages of the fastening device according to the present invention are as follows:

(a') possibility of inserting a cross member between two uprights separated by a fixed distance;

(b') formation of an "elastic buffer" between the draw means operated directly by the user and the piston which acts on the connecting member to deform it elastically outwards;

(c') miniaturization of the movable assembly actuating mechanism by employing a connecting rod-crank mechanism;

(d') troublefree assembly of practically the whole of the fastening device through a single longitudinal hole, and easy insertion of the actuating lever; and

[e') possibility of adjusting the overall length of the connecting rod-crank actuating mechanism of the movable assembly to compensate for any yield of the elastic elements.

The second embodiment in FIGS. 7–9, in particular, provides for simplifying the actuating mechanisms of movable assembly 56.

What is claimed is:

1. A reversible fastening device (50) comprising connecting means (51) connecting a first (52) and a second (53) member, said connecting means (51) comprising an elastic gripper housed inside said first member (52) coaxial with a given axis; actuating means for transporting and activating said elastic gripper, said actuating means comprising a piston coaxial with and inside said elastic gripper; and a mechanism for moving said piston and said elastic gripper, at a first reversible stage, from a withdrawn position to an extracted position projecting with respect to said first member (52) and for moving said piston, at a second stage, subsequent to said first stage, from said extracted position to an intermediate position between said extracted position and said withdrawn position, in order to deform elastically said elastic gripper so as to cause the elastic gripper to engage at least one seat on said second member.

2. A fastening device (50) as claimed in claim 1, further comprising a movable assembly (56) for transporting and activating said connecting means (51); and a mechanism (70–75; 106) for moving and activating said movable assembly (56).

3. A fastening device (50) as claimed in claim 1, wherein said elastic gripper inserted inside a socket (80) on said second member (53); said socket (80) comprising said at least one seat (79) engaged by said elastic gripper.

4. A fastening device (50) as claimed in claim, wherein said actuating means comprises a draw rod (63) connected to said piston (61) by elastic means (66).

5. A fastening device (50) as claimed in claim 4, wherein said elastic means (66) permits detachment of said draw rod (63) from said piston (61) to form an elastic buffer between the draw means activated directly by the user and said piston (61) which acts on said elastic gripper to deform the elastic gripper elastically outwards.

6. A fastening device (50) as claimed in claim 2, wherein said actuating means, when moved from said withdrawn position to said extracted position and vice versa, is subjected to the action of elastic means (62).

7. A fastening device (50) as claimed in claim 2, wherein said mechanism (70–75) comprises a user-operated connecting rod (71a) and a crank (73) hinged to each other by a pin (72).

8. A fastening device (50) as claimed in claim 7, wherein said connecting rod (71 a) is activated by means of a lever (71b) connectable to said connecting rod (71 a) by means of a reversible connection (71c, 71d).

9. A fastening device (50) as claimed in claim 8, wherein said connecting rod (71 a) comprises a pin (99) and a small connecting rod (100) with a pin (101) to connect said mechanism (70–75) to a first portion of said actuating means; and said crank (73) comprises a further pin (74) to connect said mechanism (70–75) to a second portion of said actuating means; said connecting rod (71 a) also comprising a pin (70) for its own connection in fixed manner to said first member (52).

10. A fastening device (50) as claimed in claim 9, wherein said pin (74) slides in a slot (64) formed in said draw rod (63).

11. A fastening device (50) as claimed in claim 10, wherein said pin (72) is defined by two small pins (72a, 72b); and said two small pins (72a, 72b) each slide in a respective slot (85a, 85b) formed in said connecting rod (71a), so as to vary, via rotation of a screw member (71e), the overall length of said connecting rod (71a) and said crank (73).

12. A fastening device (50) as claimed in claim 2, wherein said piston moves from said withdrawn position to said extracted position and vice versa exclusively along an axis coincident with or parallel to the resultant of the fastening forces between said first member (52) and said second member (53).

13. A fastening device (50) as claimed in claim 1, wherein said elastic gripper is moved and fastened reversibly by means of a user-operated lever (71b).

14. A fastening device (50) as claimed in claim 8, wherein said first member (52) is provided with lock means (104) for so locking said lever (71b) that said elastic gripper is set to said extratted position.

15. A fastening device (50) as claimed in claim 1, wherein at least one of said first and second members (52, 53) is made of wood.

16. A fastening device (50) as claimed in claim 1, wherein said mechanism (70–75; 106) is a cam assembly (106) in contact with a stylus (105).

17. A fastening device (50) as claimed in claim 16, wherein said cam assembly (106) comprises a pin (113) fitted with a central cam (115) and two lateral cams (116) on either side of the central cam.

18. A fastening device (50) as claimed in claim 16, wherein said stylus (105) is integral with said piston (61).

19. A fastening device (50) as claimed in claim 16, wherein said cam assembly (106) is activated manually by means of an Allen wrench (104).

* * * * *

UNITED STATES PATENT AND TRADEMARK OFFICE
CERTIFICATE OF CORRECTION

PATENT NO. : 6,602,033 B2
DATED : August 5, 2003
INVENTOR(S) : Francesco Nettis et al.

It is certified that error appears in the above-identified patent and that said Letters Patent is hereby corrected as shown below:

<u>Title page,</u>
Item [75], Inventors, after "Bitonto (IT)" insert -- Giuseppe Consiglio, Acquaviva Delle Fonti (IT) --.

Signed and Sealed this

Twenty-third Day of March, 2004

JON W. DUDAS
*Acting Director of the United States Patent and Trademark Office*